United States Patent
Williams, Jr.

[11] Patent Number: 6,137,086
[45] Date of Patent: Oct. 24, 2000

[54] VEHICLE WINDOW WITH HEATED WIPER REST

[75] Inventor: Archie J. Williams, Jr., Rossford, Ohio

[73] Assignee: Libbey-Owens-Ford Co., Toledo, Ohio

[21] Appl. No.: 09/416,156

[22] Filed: Oct. 11, 1999

Related U.S. Application Data

[60] Provisional application No. 60/122,157, Feb. 26, 1999.

[51] Int. Cl.[7] .................................................. B60L 1/02
[52] U.S. Cl. ........................... 219/203; 219/522; 338/307
[58] Field of Search ..................... 219/203, 219, 219/522, 535, 543, 547; 338/307, 308, 311, 314

[56] References Cited

U.S. PATENT DOCUMENTS

| | | |
|---|---|---|
| 4,004,126 | 1/1977 | Boaz . |
| 4,373,130 | 2/1983 | Krasborn et al. . |
| 4,388,522 | 6/1983 | Boaz ........................................ 219/543 |
| 4,410,843 | 10/1983 | Sauer et al. .............................. 219/203 |
| 4,644,139 | 2/1987 | Harrison et al. ......................... 219/522 |
| 4,673,609 | 6/1987 | Hill ......................................... 219/203 |
| 4,845,344 | 7/1989 | Price et al. ............................... 219/547 |
| 4,910,380 | 3/1990 | Reiss et al. . |
| 4,971,848 | 11/1990 | Ruelle et al. ............................ 219/522 |
| 5,386,098 | 1/1995 | Knudsen . |
| 5,390,595 | 2/1995 | Cutcher ................................... 219/203 |
| 5,653,903 | 8/1997 | Pinchok, Jr. et al. ................... 219/203 |
| 5,796,071 | 8/1998 | Morin et al. ............................ 219/203 |
| 5,861,606 | 1/1999 | Castle et al. ............................ 219/203 |
| 5,877,473 | 3/1999 | Koontz ................................... 219/203 |
| 6,011,244 | 1/2000 | Castle et al. ............................ 219/522 |

*Primary Examiner*—Teresa Walberg
*Assistant Examiner*—Fadi H. Dahbour
*Attorney, Agent, or Firm*—Marshall & Melhorn

[57] ABSTRACT

A vehicle window assembly includes one or more resistance heating lines for electrically heating a section of the window area corresponding to a window wiper rest area. An opaque obscuration band is formed so as to define one or more elongate, relatively narrow wiper alignment apertures along a portion of the window at the wiper rest area. The aperture(s) defined by the obscuration band are positioned so as to be aligned with at least a portion of a heating line. In this manner, at least a portion of the heating line is visible from the exterior of the vehicle through the outer surface of the window.

16 Claims, 2 Drawing Sheets

VEHICLE WINDOW WITH HEATED WIPER REST

RELATED APPLICATIONS

This application is claiming the benefit, under 35 U.S.C. § 119(e), of the provisional application filed Feb. 26, 1999 under 35 U.S.C. § 111(b), which was granted a Ser. No. of 60/122,157. The provisional application, Ser. No. 60/122,157, is hereby incorporated by reference.

BACKGROUND OF THE INVENTION

The invention relates generally to vehicle windows and, more particularly, to vehicle windows including an arrangement for electrically heating a section of a vehicle window corresponding to a wiper rest area.

It has been recognized for some time that, in cold weather conditions resulting in snow and ice, vehicle window wipers are susceptible to freezing or blocking to the window while in the rest or parking position. This is especially true with windshield wipers, which may be mounted at or below the level of the hood of the vehicle so that snow and ice is able to accumulate in the wiper rest area.

Arrangements for electrically heating the rest areas for windshield wipers are known. For example, U.S. Pat. Nos. 5,386,098, and 4,004,126 disclose an electric heating grid placed against the inside surface of a windshield proximate the wiper rest area. Bus bars were applied along the sides of the window and were joined by the electrically conductive filaments running transversely along the surface of the window between the bus bars. The outward appearance of these type of windows was, however, undesirable due to the visibility of the bus bars and filaments.

It is further common and well known with regard to vehicle windows to have glass with an obscuration band applied thereto for masking a portion of the structure to which the window is applied. The obscuration band hides otherwise visible features of the structure in which the windshield or structural glass is used. The obscuration band, whether a black ceramic enamel band, or other type, is normally screen printed onto the substrate to which it is being applied. In U.S. Pat. No. 4,373,130, the heating lines provided in the wiper rest area are sandwiched between opaque ceramic heat absorbing layers. The disclosed arrangement completely conceals the heating lines from view.

SUMMARY OF THE INVENTION

In accordance with the invention, there is provided a vehicle window assembly including one or two transparent substrates, preferably glass, and at least one wiper. An arrangement is provided for electrically heating the section of the transparent sheet(s) at the area corresponding to the wiper rest area; that is, the location at which the wiper blade rests while the wiper is not in an operational mode. More specifically, a heating grid pattern formed of a plurality of horizontally spaced resistance heating lines is in thermal contact with at least a portion of the area of the window corresponding to the window wiper rest area. The heating lines are electrically connected at each end to bus bars having electrical leads which are connected to an electrical power source.

An opaque obscuration band made of a layer of non-conducting material is applied to a portion of the window, including an area corresponding to the window wiper rest area. In accordance with the invention, the obscuration band is formed so as to define one or more elongate, relatively narrow wiper alignment apertures along a portion of the window at the wiper rest area. Each of the one or more apertures in the band are devoid of, but surrounded about their periphery by, the opaque material forming the opaque obscuration band. The apertures defined by the obscuration band are positioned so as to be aligned with one of the heating lines. In this manner, at least a portion of the heating line is visible from the exterior of the vehicle through the outer surface of the window.

The invention thus provides a heated wiper rest arrangement which facilitates the removal of the snow and/or ice, which may otherwise compromise wiper blade operation, from that portion of the vehicle window corresponding to the wiper rest area. The invention also provides a single heating line visible from the exterior of the vehicle through the aperture defined by the obscuration band. As the window is typically mounted in the vehicle prior to the installation of the window wiper units on the vehicle, this visible heating line provides an especially advantageous reference against which the window wiper blade or blades can be aligned during installation of the wiper unit. This reduces the labor and special tooling otherwise required for the installation of the wipers during assembly of the vehicle.

Moreover, in accordance with the invention, the above advantages are accomplished with an arrangement which is also aesthetically acceptable. The majority of the heating grid for the wiper rest area is concealed from view from the exterior of the vehicle by the opaque obscuration band. It is only the single heating line which is not concealed by the obscuration band, and some or all of this heating line may advantageously be concealed by the wiper blade or blades at such times as the blade or blades are in the rest position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
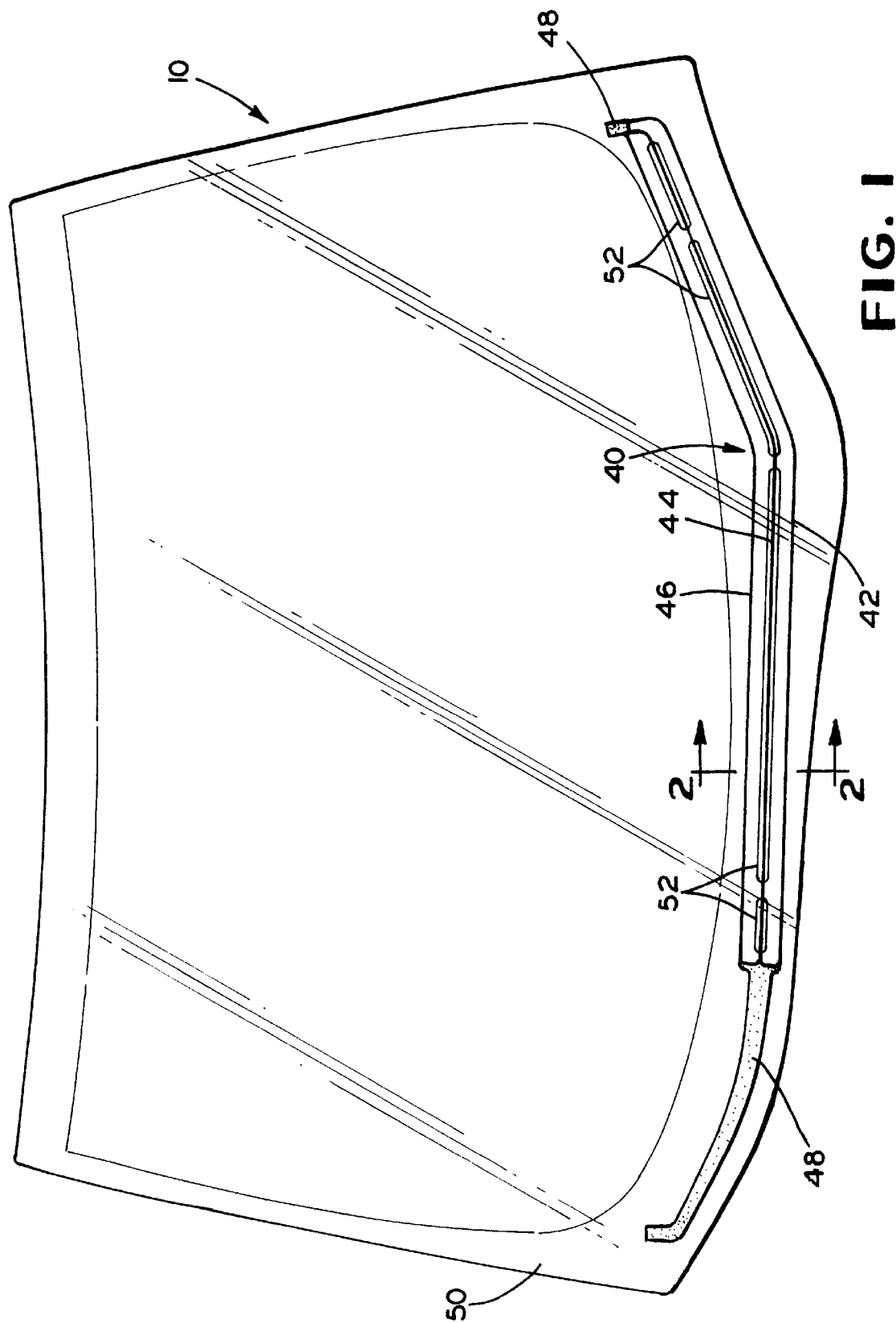
FIG. 1 is a plan view, with portions broken away, of a vehicle windshield in accordance with an embodiment of the invention.
Figure 2:
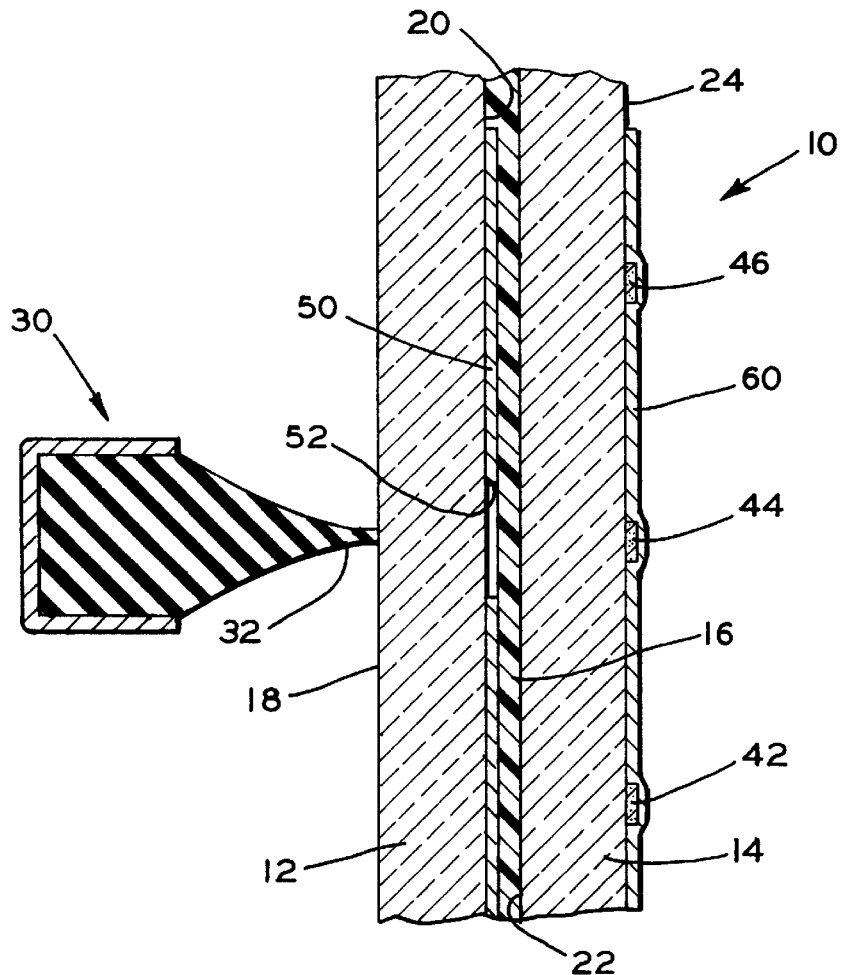
FIG. 2 is a cross-sectional view taken along line 2—2 of FIG. 1, and further showing a wiper blade in the rest position.

Referring now to FIGS. 1 and 2, there is illustrated a vehicle window assembly in accordance with the invention and denoted generally by the numeral 10. The window assembly 10 is particularly adapted for use as an automotive windshield, comprised of an outer glass sheet 12 and an inner glass sheet 14 laminated together by a plastic interlayer 16, as is well known in the art. For purposes of reference, the outer and inner surfaces of the glass sheets 12 and 14 are typically designated as first through fourth surfaces of the windshield. Relative to the laminated window assembly or windshield 10, an outer surface 18 of the outer glass sheet 12 is the first or number one surface, an inner surface 20 of the outer glass sheet 12 is the second or number two surface, an inner surface 22 of the inner glass sheet 14 is the third or number three surface, and an outer surface 24 of the inner glass sheet 14 is the fourth or number four surface.

A conventional windshield wiper 30 having a windshield wiper blade 32 formed from rubber or the like is illustrated, somewhat schematically, relative to the windshield 10 in the sectional view of FIG. 2. The windshield wiper 30 rests in a rest position in an area at a lower section of the windshield 10. A second windshield wiper (not shown) typically also rests, when in a parked or rest position, in an area at the lower section of the windshield 10. When activated, the windshield wiper blades traverse the windshield 10 to clear water or debris therefrom. It is to be understood that one of ordinary skill in the art will be able to apply the teachings of the present invention to any automobile glazing unit, i.e. whether front, side or rear, which is equipped with a windshield wiper arrangement.

A heating grid pattern, shown generally at 40, is provided on the fourth surface 24 of the windshield 10. As shown in FIG. 1, the heating grid pattern 40 is aligned with an area of the lower portion of the windshield 10 corresponding to an area where the windshield wiper blades rest in their parked position. When electricity is allowed to flow through the electrically resistant grid pattern 40, heat is generated to locally heat the windshield 10 at the lower portion thereof, including the area where the windshield wiper blades are parked.

Figure 3:
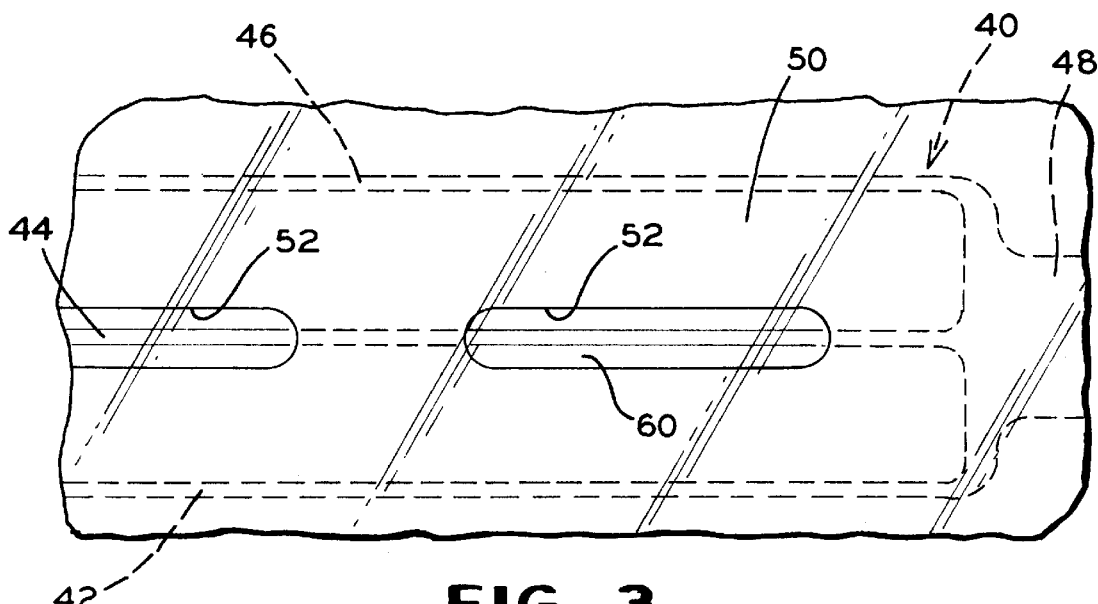
FIG. 3 is an enlarged, exterior plan view of a portion of the windshield illustrated in FIG. 1.

As shown in FIGS. 1 and 3, and in cross-section in FIG. 2, the heating grid pattern 40 includes a plurality of horizontally spaced resistance heating lines. In the illustrated embodiment, there is provided a lower heating line 42, a middle heating line 44, and an upper heating line 46. Preferably, the heating lines 42, 44 and 46 substantially traverse, in parallel, the majority of the length of the lower portion of the windshield 10. The heating lines 42, 44 and 46 are preferably equally horizontally spaced, but may have a spacing arrangement which varies according to the desired heating characteristics.

Further, although three heating lines are illustrated, the number of heating lines may also vary according to the desired heating characteristics. For example, two or three heating lines may be sufficient to heat a smaller windshield wiper rest area, while four, five, six, seven or even more heating lines may be required to heat a larger windshield wiper rest area. It is to be understood that the practice of the present invention is not limited to any particular number of heating lines, but that one of ordinary skill in the art may apply any number of heating conductors required to sufficiently heat a desired area. Moreover, although a single grid pattern is shown, it is to be understood that two or more grid patterns may be employed in series or in parallel to produce a useful heating arrangement in accordance with the invention.

The heating lines 42, 44 and 46 may be formed from any material which promotes electrical conductance and has an electrical resistance so as to generate useful heat. For example, the heating lines may be formed from metal wire, such as copper, aluminum, nickel, gold, silver, tungsten or platinum, or they may be fashioned from either enamel or ceramic materials made conductive by deposits of the above metals, such as silver, disposed therein. Various compositions of such enamels or ceramics for the purpose of providing electrically conductive lines are well known to those skilled in the art. Such materials are deposited on and bonded to the desired window surface using methods well known in the art, such as conventional screen printing methods, directional nozzle type printing, or the like.

The heating lines 42, 44 and 46 are electrically connected at each end to bus bars 48. As with the heating lines, the bus bars 48 are formed from electrically conductive materials such as wire or, preferably, deposited enamel or ceramic materials as discussed above. The bus bars 48 are designed to conduct electricity without generating a significant amount of heat. The bus bars are conventional having electrical leads (not shown) which are connected to an electrical power source (not shown).

The heating lines 42, 44 and 46 and bus bars 48 may be placed at any of the windshield surfaces 18, 20, 22 or 24. All that is required is that the heating lines be in thermal contact with an area of the windshield corresponding to the wiper rest area. Of course, placement of the heating lines and bus bars at one of the surfaces 20, 22 or 24 avoids the harmful effects of direct weather conditions associated with placement on the exterior surface 18 of the windshield 10. In a preferred embodiment, as shown in FIG. 2, the heating lines and bus bars are applied to the interior surface 24 of the windshield 10, as this simplifies the electrical connections and facilitates repair or replacement of the heating lines or bus bars, if needed.

The windshield 10 is further provided with an obscuration band 50 applied to at least the lower portion of the windshield, especially that portion corresponding to the windshield wiper rest area. In the preferred embodiment illustrated in FIG. 1, the obscuration band 50 is generally applied about the entire periphery of the windshield 10. Preferably, as shown in FIG. 2, the obscuration band 50 is applied onto the second surface 20 of the windshield 12.

As is well known in the art, the obscuration band 50 may be formed of a layer of any suitable opaque material. Conventionally, the obscuration band 50 is formed of a black ceramic enamel, typically applied to the surface of the windshield 10 by a screen printing process or the like, although the it may be provided by other known methods, such as directional nozzle type printing, etc.

In accordance with the invention, the obscuration band 50 is formed so as to define one or more elongate, relatively narrow apertures 52 in the band 50 along a portion of the windshield 10 corresponding to the wiper rest area. Each of these one or more apertures 52 is devoid of, but is surrounded about its periphery by, the opaque material forming the obscuration band 50. These one or more apertures 52 may be preferably formed simply by applying the material forming the obscuration band 50 to the desired surface of the windshield 10 so that the desired areas for the aperture(s) 52 remain uncoated by the opaque material forming the obscuration band 50.

As best seen in FIGS. 2 and 3, the elongate apertures 52 defined by the obscuration band 50 are positioned so as to be aligned with one of the heating lines. Preferably, the apertures 52 in the band 50 are aligned with the heating line 44 which, in the preferred embodiment shown in FIG. 2, is also aligned with the wiper blade 32. In this manner, at least a portion of the heating line 44 is visible from the exterior of the vehicle through the outer surface of the windshield 10, as best shown in FIG. 3., at least at such times as the wiper blade 32 itself does not obscure the view of the heating line 44.

While the obscuration band 50 is shown as applied to the surface 20 of the windshield 10, it could be applied to any of the surfaces 18, 20, 22 or 24. All that is required is that the obscuration band be applied at a position exterior to (or to the left of, as viewed in FIG. 2) the position of the heating lines 42, 44 and 46, and the bus bars 48. Again, placement of the obscuration band 50 on the exterior surface 18 would disadvantageously result in direct exposure of the band 50 to the outside environment and weather conditions.

In a preferred embodiment of the invention, a second obscuration band 60 formed of an opaque material is applied to the windshield 10, placed to the interior of (or to the right of, as viewed in FIG. 2) the heating lines 42, 44 and 46 and bus bars 48. Thus, as shown, the second obscuration band 60 is applied over the heating lines 42, 44 and 46 and bus bars 48 on the interior windshield surface 24. Unlike the first obscuration band 50, the second obscuration band 60 preferably lacks any discontinuity or apertures therein, other any small apertures required for attachment of leads to the bus bars 48. The second obscuration band 60 thereby serves to protect and insulate the heating lines and bus bars. Further, the second band 60 can advantageously provide a background behind the aperture(s) 52 which is the same color (preferably black enamel) as the first band 50, ensuring that only the relatively thin heating line 44 is visible through the aperture(s) 52.

As with the first obscuration band 50, the second obscuration band 60 may be formed of any of the conventionally suitable materials, preferably black enamel. Likewise, the second obscuration band 60 may be applied to the windshield 10 by any of the known application methods.

The window assembly 10 of the invention may be formed using production techniques generally well known to those skilled in the art. As discussed above, the first obscuration band 50, heating lines 42, 44 and 46, bus bars 48, and optional second obscuration band 60 are applied to the desired surfaces of the windshield. Thereafter, the glass sheets 12 and 14 may be bent to a desired shape as is well known in the art. The glass sheets 12 and 14 may also be bent to any desired shape first, depending upon the particular methods used to apply the heating lines and bus bars.

The plastic interlayer 16 is then positioned between the surface 20 of the glass sheet 12 and the surface 22 of the inner glass sheet 14. After assembly, the outer glass sheet 12 is laminated to the inner glass sheet 14 utilizing the plastic interlayer, typically polyvinyl butyral, for example, and placing the assembly in an autoclave under elevated temperature and pressure in the conventional manner.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A window assembly for installation in a vehicle and adapted for use with at least one window wiper, comprising:
    a transparent panel having an inner surface and an outer surface;
    an obscuration band made of a layer of an opaque material applied to a portion of said panel, said opaque material defining an elongate transparent aperture in said obscuration band which is aligned with a portion of said window at which said window wiper parks when at rest; and
    a heating grid including a plurality of electrically conducting elements secured to said panel so that at least a first one of said electrically conducting elements is aligned with the opaque material of said obscuration band, and at least a portion of a second one of said electrically conducting elements is aligned with the elongate aperture defined by the opaque material of said obscuration band, whereby said first element is concealed from view through said outer surface of said panel and said portion of said second element is visible through said outer surface of said transparent panel.

2. A window assembly as defined in claim 1, further comprising a second layer of an opaque material applied over said portion of said second element and the aperture defined by the opaque material of said obscuration band, such that said portion of said second element remains visible through said outer surface of said panel.

3. A window assembly as defined in claim 2, wherein said second layer and said obscuration band are substantially the same color.

4. A window assembly as defined in claim 3, wherein said second layer and said obscuration band are formed of black enamel.

5. A window assembly as defined in claim 1, wherein said heating grid is secured to said inner surface of said panel.

6. A window assembly as defined in claim 1, wherein said panel is formed of an inner transparent substrate and an outer transparent substrate bonded together with a plastic interlayer interposed therebetween.

7. A window assembly as defined in claim 6, wherein said obscuration band is applied to a surface of the outer substrate which is adjacent to said interlayer.

8. A window assembly as defined in claim 6, further comprising a second layer of an opaque material applied to a surface of the inner substrate which is spaced from said interlayer so that said second layer of an opaque material covers said portion of said second element and the aperture defined by the opaque material of said obscuration band.

9. A window assembly as defined in claim 1, wherein said opaque material of said obscuration band defines a plurality of generally linearly aligned elongate apertures.

10. A window assembly for installation in a vehicle having a least one window wiper, comprising:
    a window having inner and outer transparent substrates bonded together with a plastic interlayer therebetween, said inner and outer substrates each having an upper and a lower portion and an inner and outer surface;
    an obscuration band made of a layer of opaque material applied about a surface of said inner or outer substrate, at least along the lower portion thereof, said opaque material defining an elongate transparent aperture devoid of said opaque material in said obscuration band which is aligned with a portion of said window at which said window wiper parks when at rest; and
    at least one electrically conducting element secured to a surface of said inner or outer substrate inwardly of said obscuration band, so that at least a first portion of said electrically conducting element is aligned with the elongate aperture defined in said obscuration band, whereby said first portion of said electrically conducting element is visible through said outer substrate.

11. A window assembly as defined in claim 10, wherein said at least one electrically conducting element includes a second portion aligned with the opaque material forming said obscuration band, whereby said second portion of said electrically conducting element is not visible through said outer substrate.

12. A window assembly as defined in claim 10, further comprising a second layer of an opaque material applied over said aperture defined by the opaque material of said obscuration band, such that said first portion of said element remains visible through said outer surface of said panel.

13. A window assembly as defined in claim 12, wherein said second layer and said obscuration band are substantially the same color.

14. A window assembly as defined in claim 13, wherein said second layer and said obscuration band are formed of black enamel.

15. A vehicle window assembly comprising:
   a window formed of at least one transparent panel and having an outer surface, an inner surface, and a lower portion;
   an electrically resistant grid pattern in thermal contact with an area of the lower section of the window, the grid pattern including first and second horizontally spaced resistance heating lines;
   bus bars disposed along and electrically connecting opposite edges of each of the heating lines, with the bus bars being connected to a power source to provide current flow through the bus bars and the heating lines; and
   an obscuration band made of a layer of an opaque material applied to a portion of the lower section of said window, the opaque material of said obscuration band being applied so as to be aligned with said first heating line and so as to define an elongate aperture which is aligned with at least a portion of said second heating line;
   whereby said first heating line is concealed from view through said outer surface of said window and said portion of said second heating line which is aligned with said aperture is visible through said outer surface of said window.

16. A window assembly as defined in claim 15, further comprising a windshield wiper blade which rests on said outer surface of said window in a position aligned with the elongate aperture defined by the opaque material of said obscuration band.

* * * * *